United States Patent [19]
Watson

[11] 3,733,498
[45] May 15, 1973

[54] DUAL-VOLTAGE FEEDBACK COMPARATOR FOR SIMULTANEOUSLY MONITORING A POSITIVE AND NEGATIVE VOLTAGE

[75] Inventor: Milton R. Watson, Tulsa, Okla.

[73] Assignee: Telex Computer Products, Inc., Tulsa, Okla.

[22] Filed: Sept. 27, 1971

[21] Appl. No.: 183,847

[52] U.S. Cl. ................. 307/297, 307/235, 307/313, 330/30 D, 330/40
[51] Int. Cl. .............................................. H03k 1/12
[58] Field of Search ..................... 307/297, 235, 313; 323/1, 4; 330/30 D, 69, 40

[56] References Cited
UNITED STATES PATENTS

| | | | |
|---|---|---|---|
| 3,546,564 | 12/1970 | Denny | 323/1 |
| 3,392,344 | 7/1968 | Meacham | 330/24 |
| 3,508,081 | 4/1970 | Matsuda | 307/255 |
| 3,529,256 | 9/1970 | Crabbe | 330/30 D |

OTHER PUBLICATIONS

Williams, "Low-Voltage Level-Sensing Circuit"; Electronic Engineering, Vol. 40, No. 487 0517-519 S: 1968.

*Primary Examiner*—John Zazworsky
*Attorney*—Head & Johnson

[57] ABSTRACT

In this invention a positive voltage V1 and a negative voltage V2 are simultaneously monitored by two voltage comparators, which compare voltages on two potentiometers with a standard reference voltage. The potentiometers are tied between constant current loops, each comprising a zener diode, a resistance, and a transistor. When either of the voltages changes the collector of the appropriate transistor takes up the voltage, and thus the potentiometers shift in their potential in accordance with the change of the monitored voltages. These changes in potential are transferred to the comparators which switch their output from a logical zero to a logical one whenever the voltages they are monitoring vary by more than a selected value from a preselected value.

4 Claims, 1 Drawing Figure

PATENTED MAY 15 1973    3,733,498
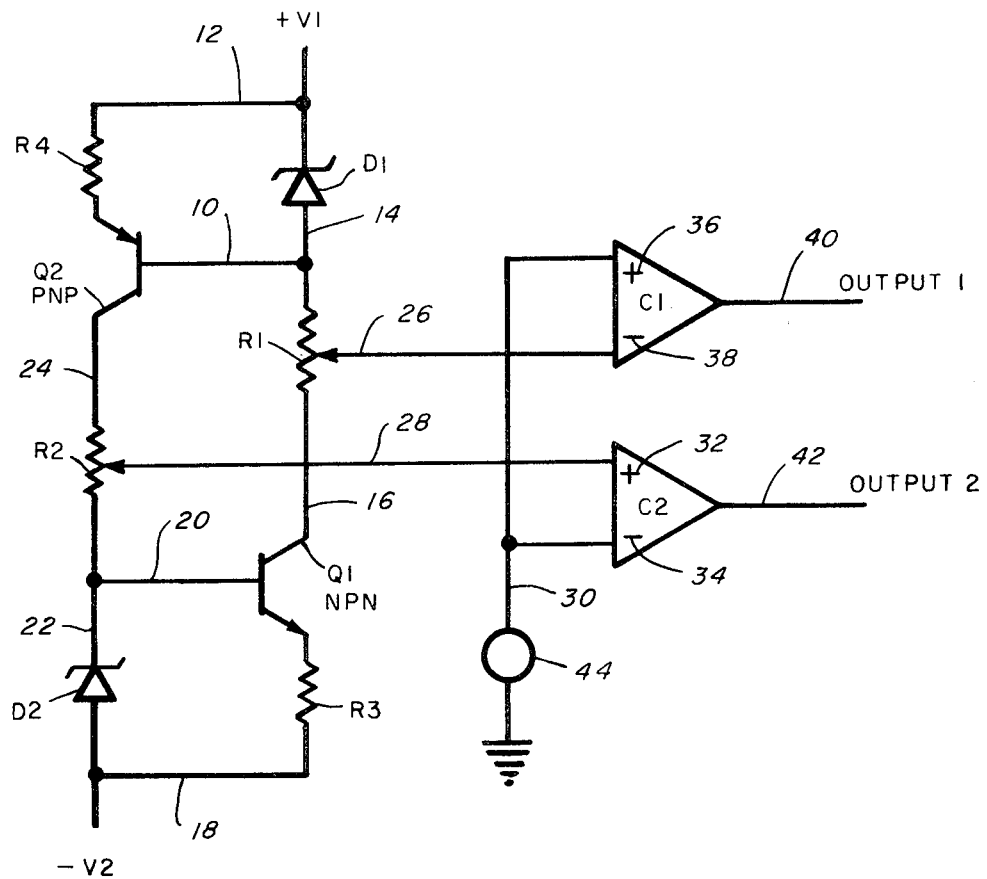

DUAL-VOLTAGE FEEDBACK COMPARATOR FOR SIMULTANEOUSLY MONITORING A POSITIVE AND NEGATIVE VOLTAGE

BACKGROUND OF THE INVENTION

1. Field of the Invention

This invention lies in the field of digital instrumentation for monitoring voltages. More specifically it is concerned with monitoring two voltages, a positive and a negative voltage in such a way that each part of the system cooperates with the other to provide a simple network for accomplishing both results.

2. Description of the Prior Art

While it is old in the prior art to monitor voltages and to provide digital outputs when the voltage is varied by more than a selected value, there is no art related to the type of circuit of this invention which differs from the prior art in that it simultaneously monitors a positive and a negative voltage with extremely simple instrumentation.

SUMMARY OF THE INVENTION

The deficiencies of the prior art devices are overcome and the objectives of this invention are furthered by a circuit in which two voltages, a positive and a negative voltage, are monitored by a very simple network. Constant current and constant voltage loops are provided, connected to the positive voltage and the negative voltage respectively. These loops with two potentiometers provide in effect two parallel conductors which carry constant current between the positive and the negative voltages. Involved in each of these conductors is a transistor which operates in such a way that when either the positive or the negative voltage varies, one or the other transistor collector absorbs the change of voltage and shifts the potential of one or the other potentiometers. The potentiometers are connected to voltage comparators which compare these voltages with a standard reference voltage. The comparators are designed so as to change their outputs from a logical zero to a logical one whenever the voltage input changes by a selected voltage magnitude, which is adjustable by means of the potentiometers.

It is an object of this invention to provide a simple network for monitoring a positive and a negative voltage to provide logical changes from zero to one whenever there is a change of either of the voltages from a preselected value by as much as a selected small change of voltage.

These and other objectives of this invention and a clear understanding of the principles of the invention will be evident from the following description taken in conjunction with the appended drawing, in which:

BRIEF DESCRIPTION OF THE DRAWING

FIG. 1 illustrates an embodiment of this invention in its preferred form.

DESCRIPTION OF THE PREFERRED EMBODIMENT

Referring now to the drawing, V1 represents the positive voltage to be monitored and V2 represents the negative voltage to be monitored. A zener diode D1, resistance R4, and PNP transistor Q2 form a loop which has a constant current and which supports a constant voltage across the zener diode D1. At the negative voltage terminal a similar loop employing a zener diode D2 resistance R3 and NPN transistor Q1 provide a constant voltage across the diode D2. The two networks are tied together by means of a potentiometer R1 between D1 and Q1, and a second potentiometer R2 between zener diode D2 and transistor Q2.

Starting at the voltage +V1, going through the zener diode D1, the voltage drops by a constant value. Furthermore since there is constant current through R3, there is a constant current through R1 and the voltage across R1 is constant. The voltage from the base of transistor Q1 to −V2 is constant. Therefore, as the voltage +V1 changes the change in voltage must be taken up somewhere, and that is done by the collector of Q1 connected to lead 16. Thus as V1 changes, R1 moves up or down in potential exactly as V1 moves, so that lead 26 connected to a potentiometer partakes of this same voltage change. Lead 26 connects to terminal 38 of a voltage comparator C1, the positive terminal 36 of which is connected through a reference voltage to ground. The comparator C1 is a standard item of electronic equipment, it is available on the market and can be similar to the model number LM311, manufactured by the National Semiconductor Company, of 2900 Semiconductor Drive, Santa Clara, California. The potentiometer terminal 26 can be adjusted upward or downward so that it is slightly higher, by a small voltage, such as 0.1 volt, above the voltage of the reference 44. Now as the voltage +V1 varies, if it drops by more than 0.1 volt the terminal 38 of the comparator C1 will drop negative and the action of the comparator when that happens is to change its output from a logical zero to a logical one. Its action is not an analog action, it acts simply to change its output from a logical zero to a logical one whenever the input comparison voltage goes negative. The amount that the voltage V1 is permitted to vary before this happens can be set by the potentiometer R1.

In a similar way starting with voltage −V2 and going upward in the diagram through the zener diode D2 we reach the base lead 20 of the Q1 transistor which is at a constant potential and since there is constant current through the resistance R4 there is a constant current through R2 and there is constant potential drop across R2 to the collector of transistor Q2. Since the base of Q2 is also constant voltage, therefore as V2 changes the change in voltage appears across the collector to base of the transistor Q2 and therefore potentiometer R2 swings in voltage in step with the −V2 potential.

These two actions are entirely independent. For example, consider that V1 is fixed and V2 is varying. That means that the potential of the base 20 of Q1 will vary. But that has no effect, since the collector can vary in absolute potential with respect to the base irrespective of the emitter potential. Thus the collector-base arrangement of Q1 isolates the absolute potential of R1 from any changes in V2. Similarly the collector-base potential of Q2 isolates the potentiometer R2 from any changes in voltage V1.

Leads 26 to R1 and 28 to R2 therefore carry individually the absolute potential changes of the voltages V1 and V2 respectively. The voltage on lead 28 goes to the positive terminal 32 of comparator C2 while the reference voltage goes to be negative terminal 34. Thus any change in −V2 which tends to make it more positive will cause the comparator output 2 to change from its logical zero to its logical one output on lead 42. It is possible to connect the output leads 40 and 42 to an OR gate, or to other apparatus, so that a single indication can be made of a change in either one or the other of V1 or V2 in the direction as indicated, as is well known in the art.

The value of the voltage reference 44 is chosen to be approximately midway between +V1 and −V2. That is, the voltage reference equals V1 − V2 divided by 2. If +V1 and −V2 are of approximately the same magnitude, then their voltage reference will be close to zero volts and thus the ground connection may be used for a voltage reference. This is another advantage of the circuit since both voltages can be compared to zero volts, or ground potential.

While the invention has been described with a certain degree of particularlity, it is manifest that many changes may be made in the details of construction and the arrangement of components. It is understood that the invention is not to be limited to the specific embodiment set forth herein by way of exemplifying the invention but the invention is to be limited only by the scope of the attached claim or claims including the full range of equivalency to which each element or step thereof is entitled.

What is claimed:

1. A dual-voltage feedback comparator comprising:
   a. a first terminal connected to a positive voltage and a second terminal connected to a negative voltage;
   b. a first constant current circuit connected between said first and said second terminals comprising in series, a first zener diode, a first potentiometer, the collector of an NPN transistor, the emitter of which is connected through a first resistor to said second terminal;
   c. a second constant current circuit connected between said first and second terminals comprising, in series, a second resistor, the emitter of a PNP transistor, the collector of which is connected to a second potentiometer, and a second zener diode;
   d. the base of a said NPN transistor connected to the junction between said second potentiometer and said second diode, and the base of said PNP transistor connected to the junction between said first diode and said first potentiometer; and
   e. means to compare the voltages of said potentiometers to a reference voltage.

2. The comparator as in claim 1 in which said means to compare comprises:
   a. a first voltage comparator with its negative input terminal connected to said first potentiometer and its positive potential connected to said reference voltage; and
   b. a second voltage comparator with its positive input terminal connected to said second potentiometer, and its negative terminal connected to said reference voltage.

3. The comparator as in claim 2 in which the lead from said first comparator is connected to the slider of said first potentiometer.

4. The comparator as in claim 2 in which the lead from said second comparator is connected to the slider of said second potentiometer.

* * * * *